(12) United States Patent
Kawasaki et al.

(10) Patent No.: US 8,302,305 B2
(45) Date of Patent: Nov. 6, 2012

(54) METHOD FOR MANUFACTURING CAST IRON MEMBER

(75) Inventors: Minoru Kawasaki, Toyota (JP); Kohei Yanaka, Toyota (JP); Kenji Kidera, Toyota (JP); Yoshinori Ishikawa, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1231 days.

(21) Appl. No.: 12/084,055

(22) PCT Filed: Jul. 5, 2007

(86) PCT No.: PCT/JP2007/063865
§ 371 (c)(1),
(2), (4) Date: Apr. 24, 2008

(87) PCT Pub. No.: WO2008/004708
PCT Pub. Date: Jan. 10, 2008

(65) Prior Publication Data
US 2009/0151163 A1 Jun. 18, 2009

(30) Foreign Application Priority Data
Jul. 5, 2006 (JP) .................. 2006-185846

(51) Int. Cl.
*B21K 1/24* (2006.01)
(52) U.S. Cl. ............. 29/888.44; 29/888.06; 29/888.061; 29/888.4; 123/188.8; 148/522
(58) Field of Classification Search ............... 29/888.06, 29/888.061, 888.4, 888.44; 123/188.8, 188.3, 123/193.3; 148/522, 524, 525
See application file for complete search history.

(56) References Cited

U.S. PATENT DOCUMENTS

| 4,832,982 A | 5/1989 | Mori et al. |
| 5,230,756 A * | 7/1993 | Kawasaki et al. ............. 148/522 |
| 6,329,630 B1 | 12/2001 | Sato et al. |

FOREIGN PATENT DOCUMENTS

| EP | 0 221 752 A2 | 5/1987 |
| JP | 61-270335 A | 11/1986 |
| JP | 62-101392 A | 5/1987 |
| JP | 62-112786 A | 5/1987 |
| JP | 62-296983 A | 12/1987 |
| JP | 62-296984 A | 12/1987 |
| JP | 63-224890 A | 9/1988 |

(Continued)

*Primary Examiner* — Richard Chang
(74) *Attorney, Agent, or Firm* — Kenyon & Kenyon LLP (57) ABSTRACT

There is provided a method for manufacturing a cast iron member in which the production of gas defects such as blowholes or pinholes in a clad layer formed on the surface of a cast iron material can be reduced, and the generation of bead cracks in the clad layer can be restrained. In the method for manufacturing a cast iron member, including a step of forming the clad layer by melting a material for cladding by means of irradiation of a laser emitted from a laser irradiation device and by depositing the melted material on the surface of a part of the cast iron material, the step of forming the clad layer is performed by using a material the main ingredient of which is a copper element as the material for cladding so that when the clad layer is formed, a hardened layer having a thickness of 0.01 to 2.0 mm is formed on the surface of the cast iron material.

6 Claims, 6 Drawing Sheets

FOREIGN PATENT DOCUMENTS

| | | |
|---|---|---|
| JP | 63-239342 | 10/1988 |
| JP | 01-104487 | 4/1989 |
| JP | 01-104906 | 4/1989 |
| JP | 01-111855 | 4/1989 |
| JP | 03-291183 A | 12/1991 |
| JP | 07-032173 A | 2/1995 |
| JP | 11-333574 | 12/1999 |
| JP | 2002-086284 A | 3/2002 |
| JP | 2002-372070 A | 12/2002 |
| KR | 1990-4442 | 4/1990 |

* cited by examiner

| | THICKNESS OF FIRST LAYER (mm) | THICKNESS OF SECOND LAYER (mm) | CRACK | PINHOLE |
|---|---|---|---|---|
| COMPARATIVE EXAMPLE 5 | 0.05 | 1.95 | × | ○ |
| EXAMPLE 5 | 0.1 | 1.90 | △ | ○ |
| EXAMPLE 6 | 0.5 | 1.50 | ○ | ○ |
| EXAMPLE 7 | 0.8 | 1.20 | ○ | ○ |
| EXAMPLE 8 | 1.0 | 1.0 | ○ | △ |
| COMPARATIVE EXAMPLE 6 | 1.5 | 0.5 | ○ | × |
| COMPARATIVE EXAMPLE 7 | 1.90 | 0.10 | △ | × |
| COMPARATIVE EXAMPLE 8 | 1.95 | 0.05 | × | × |

METHOD FOR MANUFACTURING CAST IRON MEMBER

This is a 371 national phase application of PCT/JP2007/063865 filed 5 Jul. 2007, claiming priority to Japanese Patent Application No. 2006-185846 filed 5 Jul. 2006, the contents of which are incorporated herein by reference.

TECHNICAL FIELD

The present invention relates to a method for manufacturing a cast iron member formed with a clad layer on the surface of a cast iron material. More particularly, it relates to a method for manufacturing a cast iron member having a clad layer that is formed by depositing a cladding material melted by a laser on the surface of a cast iron material.

BACKGROUND ART

Conventionally, to enhance the durability of a valve seat for an engine cylinder head, a wear resisting clad layer has been formed as a valve seat on the contact surface with which an intake valve or an exhaust valve comes into contact. The clad layer is often formed by melting a wear resisting material (material for cladding) by using a high-density heat source such as a laser and by depositing the melted material on the contact surface.

In the case where a cast iron material is used for a cylinder head body, since the cast iron material has a higher carbon content than the general steel material, and in particular, A-type graphite that is long and big in a flat shape is present on the surface thereof, the graphite reacts with oxygen contained in the atmosphere at the time of cladding, so that carbon dioxide gas may be yielded. By this gas yielding, gas defects such as pinholes or blowholes may be produced in the formed valve seat (clad layer).

On the other hand, since the melted material is deposited at the time of cladding, the surface of the cast iron material is heated, and the surface layer including the surface may be chilled. By this chilling, the surface layer of cast iron material is solidification-shrunk, so that bead cracks may be generated in the clad layer.

To solve the above problems, as one example of a method for manufacturing a cast iron member formed with a clad layer on the surface of cast iron material, a method has been proposed in which the surface of cast iron material to be formed with the clad layer is blasted before being clad to remove, in advance, the graphite that is present in the surface part of cast iron material, and the clad layer is formed in the surface part from which the graphite has been removed (for example, refer to Patent Document 1). According to this cladding method, since the graphite has been removed in advance from the surface part of cast iron material, the yielding of carbon dioxide gas at the time of cladding is restrained, so that gas defects in the clad layer can be restrained from being produced.

On the other hand, as one example of a method for preventing the bead cracks, a method has been proposed in which a metal (for example, cast iron) having a greater tendency to form carbide than Fe and an alloy of Ni and/or Co are arranged on the surface of cast iron, and these materials are melted by a laser and solidified to perform cladding (for example, refer to Patent Document 2). Also, a method has been proposed in which after a zone subjected most to friction of the inner surface of a cast iron-made cylinder liner has been preheated, the zone is irradiated with laser beams having high energy density, by which a material having excellent wear resistance and seizure resistance is deposited to form a clad layer (for example, refer to Patent Document 3).

Patent Document 1: JP Patent Publication (Kokai) No. 1-111855
Patent Document 2: JP Patent Publication (Kokai) No. 1-104906
Patent Document 3: JP Patent Publication (Kokai) No. 1-104487

DISCLOSURE OF THE INVENTION

Even if the surface of cast iron material is blasted as described in Patent Document 1, the graphite that is present in the surface part thereof cannot be removed completely, so that it is difficult to restrain gas defects from being produced. Especially in the case where the clad layer is formed as a valve seat on the cast iron-made cylinder head body, since the cylinder head body has an intricate shape, it is difficult to remove the graphite precisely from locations to be clad. Further, in the case of a large-size diesel engine, the range in which the clad layer is formed as a valve seat is wide, and the solidification mode of the clad layer easily becomes poorly balanced, so that the production of a small number of pinholes results in the generation of cracks in the clad layer.

In the case where cladding is performed as described in Patent Document 2, the bead cracks can be restrained by alloying the cladding material and the cast iron material with each other. Also, in the case where cladding is performed as described in Patent Document 3, the heat affected zone of the cast iron member is reduced by using a laser to melt the material, by which the bead cracks can be restrained. However, when these cladding methods are simply carried out, since the reaction of graphite with oxygen gas is not restrained, the gas defects in the clad layer cannot be restrained sufficiently from being produced.

The present invention has been made to solve the above problems, and accordingly an object thereof is to provide a method for manufacturing a cast iron member in which the production of gas defects such as blowholes or pinholes in a clad layer formed on the surface of a cast iron material can be reduced, and the generation of bead cracks in the clad layer can be restrained.

The present invention provides a method for manufacturing a cast iron member, including a step of forming a clad layer by melting a material for cladding (cladding material) by means of irradiation of a laser emitted from a laser irradiation device and by depositing the melted material on the surface of a part of a cast iron material, characterized in that the step of forming the clad layer is performed by using a material the main ingredient of which is a copper element as the material for cladding so that when the clad layer is formed, a hardened layer having a thickness of 0.01 to 2.0 mm is formed on the surface of the cast iron material.

By forming the clad layer on the cast iron material as described above, the production of gas defects in the clad layer can be reduced, and also the generation of bead cracks in the clad layer can be restrained. As shown in the example described below, if the thickness of hardened layer is smaller than 0.01 mm, it is difficult to form the bead of clad layer properly, and if thickness of hardened layer is larger than 2.0 mm, gas defects are produced easily in the clad layer, and bead cracks are also generated easily in the clad layer. The hardened layer having the above-described thickness can be formed by adjusting the irradiation intensity of the laser or by adjusting the speed at which the clad layer is formed in the step of forming the clad layer.

In the cladding method in accordance with the present invention, a material having an oxygen content of 200 ppm or lower is preferably used as the material for cladding. By making the oxygen content 200 ppm or lower as described above, even if gas defects are produced in the clad layer, a valve seat (clad layer) that can sufficiently withstand the service environment of vehicular engine can be obtained, and bead cracks are not generated in the clad layer. If the oxygen content is higher than 200 ppm, as shown in the example described below, the number of gas defects increases with an increase in the oxygen content, and therefore a clad layer enough to be used as the valve seat cannot be obtained.

Further, when a clad layer is formed as described above, the cladding is preferably performed while an inert gas such as argon is blown onto the surface to be clad. By performing cladding as described above, the inclusion of oxygen gas in the atmosphere can be reduced. Thereby, the production of gas defects in the clad layer can further be reduced by the synergistic effect of the reduction in oxygen content in the cladding material described above and the reduction in inclusion amount of oxygen gas in the atmosphere.

In the method for manufacturing the cast iron member in accordance with the present invention, the step of forming the clad layer is preferably performed by adjusting the irradiation intensity of the laser to 200 W/mm$^2$ or higher. If the irradiation intensity is lower than 200 W/mm$^2$, it is difficult to form the bead of clad layer.

Also, as another mode, the step of forming the clad layer preferably includes at least a step of forming a first clad layer on the surface of the cast iron material so that the thickness thereof is in the range of 0.1 to 1.0 mm and a step of forming a second clad layer on the surface of the first clad layer so that the thickness thereof is 1.0 to 19 times the thickness of the first clad layer.

By carrying out the cladding method including the above two steps, the graphite that is present in the surface layer of cast iron material is confined by the first clad layer, and thereby the production of gas defects can be restrained. Further, by forming the two layers of the first clad layer and the second clad layer, the internal stress in the clad layer is relaxed, so that bead cracks in the clad layer can be restrained.

As shown in the example described below, if the thickness of the first clad layer is made smaller than 0.1 mm, bead cracks are easily generated in the clad layer after the formation of the second clad layer, and if the thickness of the first clad layer is made larger than 1.0 mm, gas defects are easily produced in the clad layer after the formation of the second clad layer. Further, as shown in the example described below, if the thickness of the second clad layer is made larger than 19 times the thickness of the first clad layer, bead cracks may be induced by the stress at the time of solidification shrinkage of the second clad layer. Also, if the thickness of the second clad layer is made smaller than 1.0 times the thickness of the first clad layer, the production of gas defects cannot be restrained sufficiently.

The step of forming the second clad layer is preferably performed so that the second clad layer does not deviate from the surface of the first clad layer. By forming the second clad layer so as not to deviate from the surface of the first clad layer, specifically, so that run etc. of the second clad layer does not flow from the upper part of the first clad layer and does not come into contact with the cast iron material, the production of gas defects can be prevented.

A step of applying a laser the irradiation intensity of which is adjusted to the surface of the cast iron material is preferably performed as a pretreatment step for the step of forming the clad layer so that the irradiation intensity is not lower than the intensity capable of removing graphite contained in the surface layer of the cast iron material and oil content in the graphite and so that the irradiation intensity is lower than the intensity at which the surface of the cast iron material melts. By performing the pretreatment step to remove graphite, the reaction yielding carbon dioxide gas caused by oxygen and graphite can be reduced. Also, since the irradiation intensity of laser is adjusted so as to be lower than the intensity at which the surface of the cast iron material melts, the outermost surface of cast iron material is not chilled by melting, so that cracks in the surface of cast iron material, which is a base material, can be prevented from being generated. Further, if the above-described pretreatment step is performed by using the laser irradiation device, new equipment investment is not needed, so that the pretreatment step can be performed at a low cost.

In particular, in the pretreatment step, the irradiation intensity of the laser is preferably adjusted so that the incident energy of the laser applied to the surface of the cast iron material is in the range of 10 to 20 J/mm$^2$. If the incident energy is lower than 10 J/mm$^2$, the quantity of heat is insufficient, so that graphite on the outermost surface of cast iron material and oil content contained in the graphite cannot be removed. On the other hand, if the incident energy is higher than 20 J/mm$^2$, the outermost surface of cast iron material is chilled by melting, so that cracks are generated on the surface of cast iron material.

As a further preferable method for manufacturing the cast iron member, the step of forming the clad layer is performed while either one or both of the laser irradiation device and the cast iron material are moved relatively at a speed in the range of 150 to 600 mm/min.

By forming the clad layer under the above-described speed condition, bead cracks can be reduced surely. If the relative speed is lower than 150 mm/min, the ripple part of bead constituting the clad layer may become intermittent. If the relative speed is higher than 600 mm/min, bead cracks may be generated along the movement direction of the laser irradiation device.

Further, the present invention also discloses, as a cast member obtained by the above-described cladding method, a cast iron member in which a clad layer is formed on the surface of a part of a cast iron material, characterized in that the clad layer is formed of a material the main ingredient of which is a copper element, and a hardened layer having a thickness of 0.01 to 2.0 mm is formed on the surface of the cast iron material. The clad layer of the cast iron member is not subject to any restriction, but the clad layer preferably includes a first clad layer formed on the surface of the cast iron material so that the thickness thereof is in the range of 0.1 to 1.0 mm and a second clad layer formed on the surface of the first clad layer so that the thickness thereof is 1.0 to 19 times the thickness of the first clad layer.

The above-described cast member is suitable especially for a vehicular engine whose service environment is severe and safety is regarded as of major importance because the cast member is free from gas defects such as pinholes and blowholes and bead cracks in the clad layer. Specifically, the cast iron member is preferably a cylinder head constituting the vehicular engine, and the clad layer formed on the surface of the cast iron member is preferably a valve seat constituting the cylinder head.

According to the method for manufacturing the cast iron member in accordance with the present invention, the production of gas defects in the clad layer formed on the surface of cast iron material and the generation of bead cracks in the clad layer can be restrained.

This description embraces the contents described in the specification and/or drawings of JP Patent Application No. 2006-185846, which is the basis of priority right of the present application.

BEST MODE FOR CARRYING OUT THE INVENTION

The present invention will now be described by reference to examples. However, the present invention is not limited to these examples.

Figure 1:
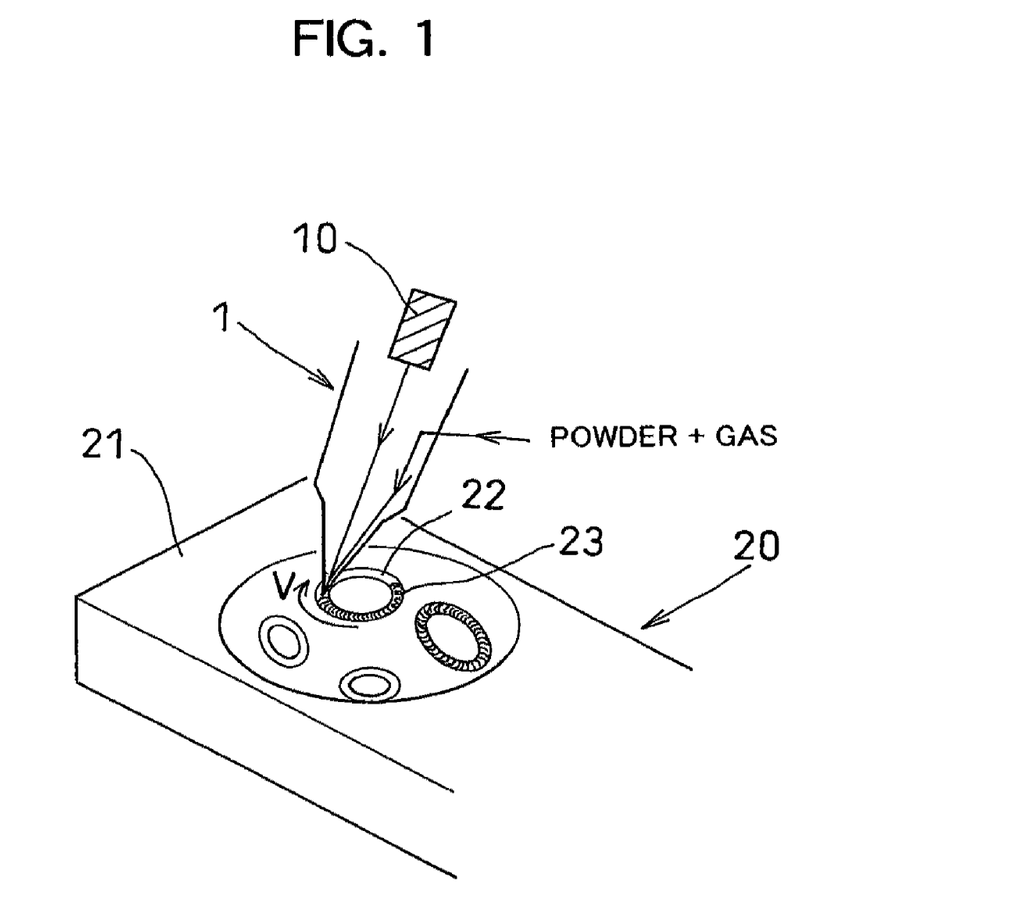
FIG. 1 is a schematic perspective view for explaining a method for manufacturing a cast iron member in accordance with the present invention.

In the examples described below, a clad layer (for example, a valve seat in the case shown in FIG. 1) 23 is formed on a surface 22 of a cast iron material (for example, a cylinder head body 21 of a vehicular engine in the case shown in FIG. 1) as shown in FIG. 1 by using a cladding device 1, whereby a cast iron member 20 is manufactured.

EXAMPLES

Example 1

Figure 2:
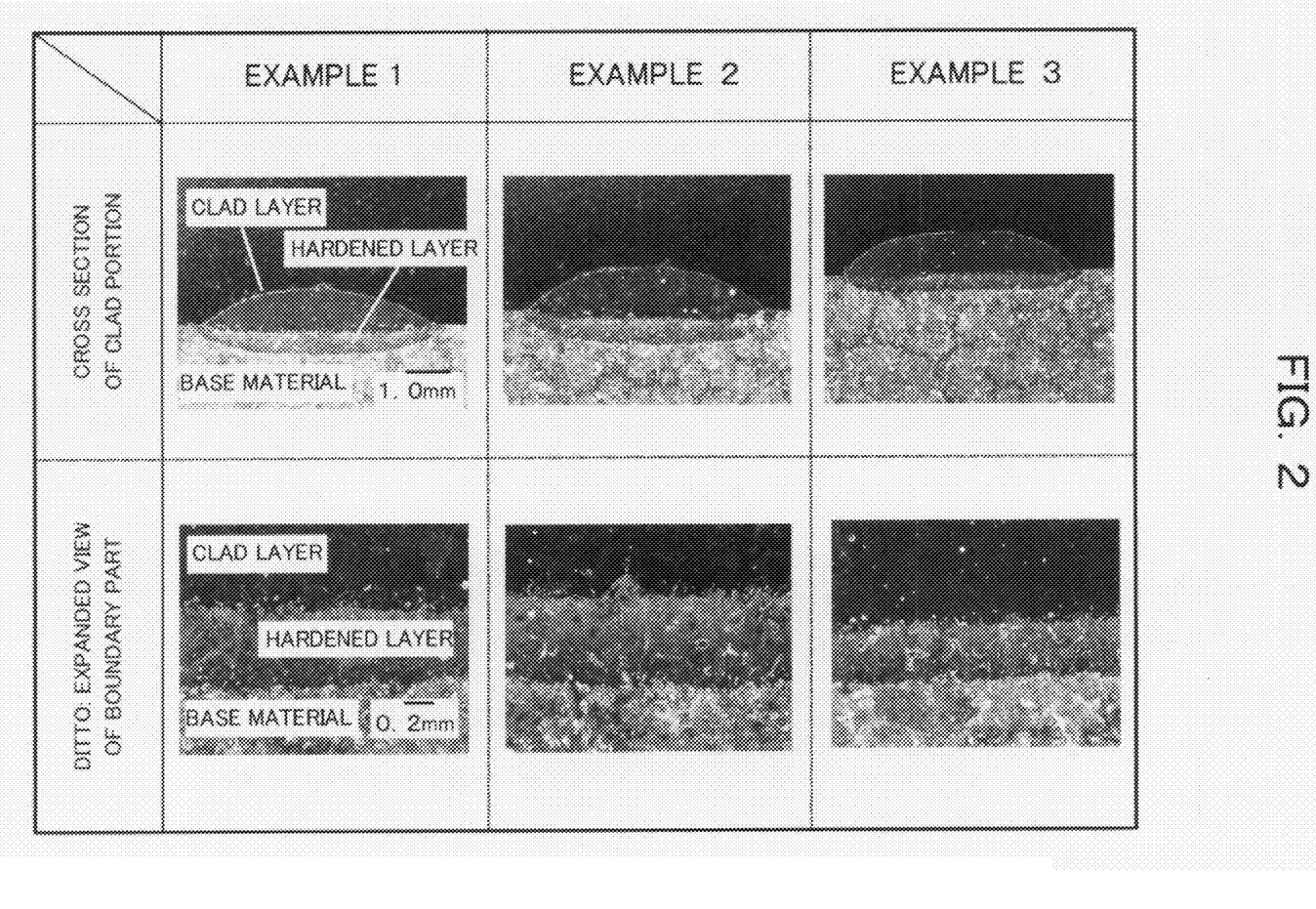
FIG. 2 is a sectional view of clad layers of Examples 1 to 3.
Figure 3:
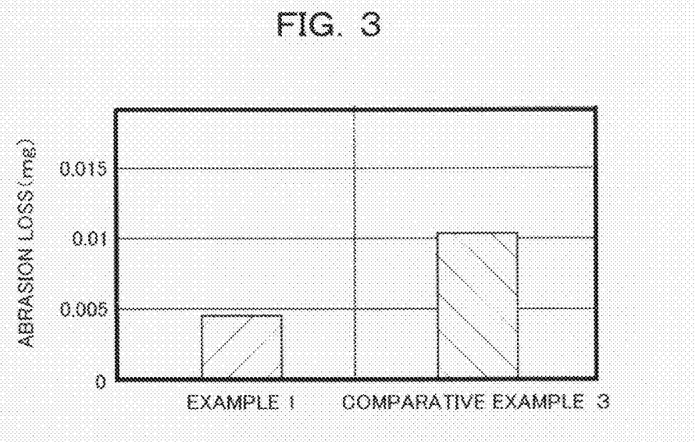
FIG. 3 is a graph showing results of wear resistance tests of Example 1 and Comparative example 3.

A cast iron material (Japanese Industrial Standards: FC25 or equivalent) having clad dimensions of 200×500×150 mm was prepared, and the surface thereof was clad by using powder of a wear resisting material, the main ingredient of which was a copper element as given in Table 1, as a material for cladding (cladding material). Specifically, as shown in FIG. 1, the powder was conveyed together with an inert gas (argon gas), and laser beams were applied to the conveyed powder from a laser irradiation device 10 having a beam irradiation area of 6.5×1.0 mm, by which the powder was melted. The melted material was deposited on the surface of a part of the cast iron material to form a clad layer. Also, the irradiation intensity of laser was set at 2.0 kw so that a hardened layer formed on the lower layer of the clad layer (surface of cast iron material) had a thickness in the range of 0.01 to 2.0 mm, and the clad layer was formed while the laser irradiation device was moved so that the relative speed (working speed) V of the laser irradiation device with respect to the cast iron material at the time of cladding was 500 ml/min. The cross section of the cast iron member manufactured as described above was observed under a microscope. The observation results are shown in FIG. 2. Further, a wear resistance test was conducted on the clad layer of cast iron member under the conditions of slide speed 0.3 m/s and pressing load 1.15 MPa. The test results are shown in FIG. 3.

TABLE 1

| Composition (%) | | | | | | | |
|---|---|---|---|---|---|---|---|
| Cu | Ni | Si | Mo | Fe | Nb | Co | Others and remarks |
| Bal | 15.0~18.0 | 2.3~3.3 | (6.0)~10.0 | 8.0~10.0 | 0.7~1.3 | 0.1 | C = 0.07~0.13 |
| | | | | | | | C = 0.08~0.023 |

Examples 2 and 3

The clad layer was formed on the surface of cast iron material, and thereby the cast iron member was manufactured in the same manner as described in Example 1. Example 2 differs from Example 1 in that the irradiation intensity of laser was 2.5 kw, and the working speed was 500 mm/min. Also, Example 3 differs from Example 1 in that the irradiation intensity of laser was 2.5 kw, and the working speed was 1000 mm/min. The cross sections of the cast iron members manufactured as described above were observed under a microscope. The observation results are shown in FIG. 2.

Comparative Example 1

The clad layer was formed on the surface of cast iron material, and thereby the cast iron member was manufactured in the same manner as described in Example 1. Comparative example 1 differs from Example 1 in that the surface of cast iron material was clad by adjusting the irradiation intensity of laser so that the hardened layer is thinner than 0.01 mm.

Comparative Example 2

The clad layer was formed on the surface of cast iron material, and thereby the cast iron member was manufactured in the same manner as described in Example 1. Comparative example 2 differs from Example 1 in that the surface of cast iron material was clad by adjusting the irradiation intensity of laser so that the hardened layer is thicker than 2.0 mm.

Comparative Example 3

A sintered material (Japanese Industrial Standards: SMF30 or equivalent) that has conventionally been press-fitted in the cylinder head as a valve seat was prepared, and was subjected to a wear resistance test under the same conditions as those of Example 1.

Result 1

As shown in FIG. 2, the cast iron members formed with the clad layers of Examples 1 to 3 were free from gas defects and bead cracks. However, in Comparative example 1, it was difficult to form the bead of clad layer. Also, in Comparative example 2, the clad layer suffered gas defects, and bead cracks were generated in the clad layer. Also, as shown in FIG. 3, the cast iron member of Example 1 achieved improved wear resistance as compared with Comparative example 3.

Consideration 1

Such a clad layer is formed by heating a material for cladding to a melting temperature (1700° C. or higher) and by depositing the melted material on the surface of the cast iron material. Therefore, the formed clad layer is self cooled and solidified by heat conduction of the surface (substrate) of cast iron material. At this time, the cast iron material is heated to a hardening transformation point temperature or higher and is cooled, so that the hardened layer is formed on the lower layer of the clad layer. From Result 1, it can be thought that if cladding is performed under the condition that a hardened layer having a thickness of 0.01 to 2.0 mm can be formed, gas defects such as pinholes can be reduced, and also bead cracks in the clad layer can be restrained. Further, in order to form a hardened layer having a thickness of 0.01 mm or larger, it is desirable to adjust the irradiation intensity of laser at least to 200 W/mm$^2$ or higher. Also, the reason why the cast iron member of Example 1 achieved improved wear resistance as compared with Comparative example 3 is thought to be that the material property itself had a favorable influence, and the clad layer was free from gas defects and bead cracks.

Example 4

Figure 4:
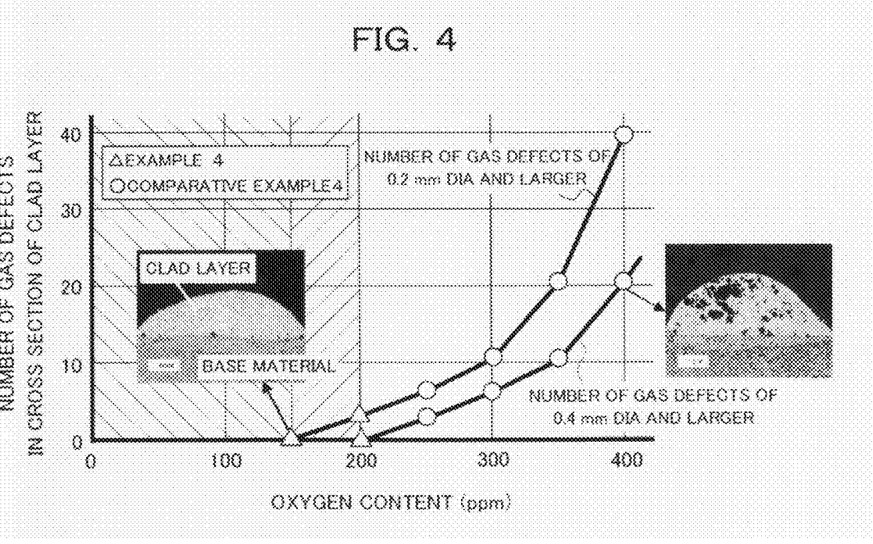
FIG. 4 is a graph showing the relationship between the content of oxygen contained in a cladding material and gas defects in clad layers in Example 4 and Comparative example 4.

The clad layer was formed on the surface of cast iron material, and thereby the cast iron member was manufactured in the same manner as described in Example 1. Example 4 differs from Example 1 in that a material having an oxygen content of 200 ppm or lower (specifically, 100 ppm, 200 ppm) was used as the cladding material. On the cross section of the clad layer of the cast iron member, the number of gas defects having an average diameter of 0.2 mm or larger and the number of gas defects having an average diameter of 0.4 mm or larger were measured. The measurement results are shown in FIG. 4. The average diameter of gas defect (pinhole) that is harmful to the valve seat is 0.5 mm or larger.

Comparative Example 4

The clad layer was formed on the surface of cast iron material, and thereby the cast iron member was manufactured in the same manner as described in Example 4. Comparative example 4 differs from Example 4 in that a material having an oxygen content exceeding 200 ppm (specifically, 250 ppm, 300 ppm, 350 ppm, 400 ppm) was used as the cladding material. The number of gas defects was measured in the same way as in Example 4. The measurement results are shown in FIG. 4.

Result 2

As shown in FIG. 4, in the case where a material having an oxygen content of 200 ppm or lower was used as the cladding material as in Example 4, gas defects having an average diameter of 0.4 mm or larger were not produced. Also, in the case where a material having an oxygen content of 100 ppm or lower was used, gas defects having an average diameter of 0.2 mm or larger were not produced. As can be seen from the results of Example 4 and Comparative example 4, the number of gas defects increased with an increase in oxygen content of the cladding material.

Consideration 2

From Result 2, it can be thought that the gas defects formed in the clad layer are produced by carbon dioxide yielded by the reaction of graphite in the cast iron material with oxygen contained in the powder (cladding material), and it can be thought that the production of most gas defects can be restrained by reducing the oxygen content. If the oxygen content is 200 ppm or lower, pinholes having an average diameter of 0.5 mm or larger, which are harmful to the valve seat, can be restrained. If the oxygen content is 100 ppm or lower, pinholes having an average diameter of 0.2 mm or smaller can be restrained, so that a higher-quality clad layer can be formed.

Example 5

Figure 5:
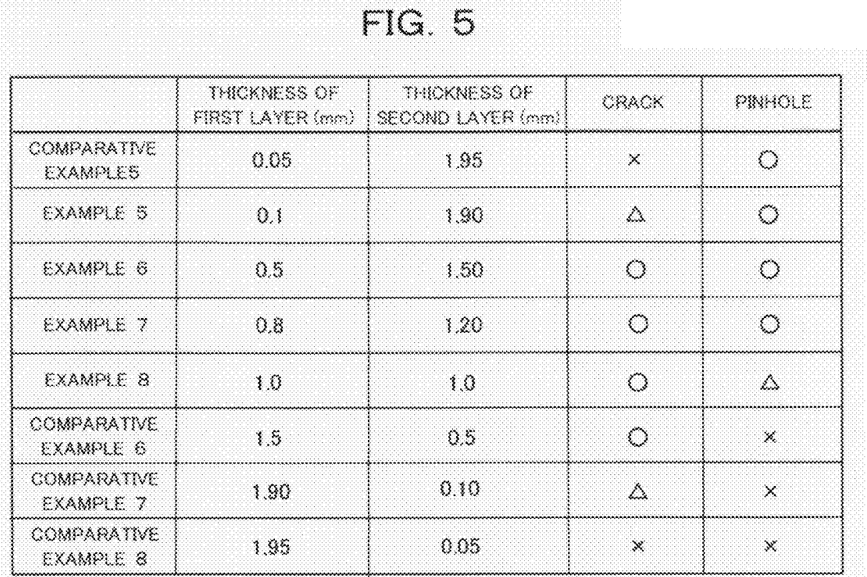
FIG. 5 is a table showing comparisons of gas defects (pinholes) and bead cracks in clad layers of Examples 5 to 8 and Comparative examples 5 to 8.

The clad layer was formed on the surface of cast iron material, and thereby the cast iron member was manufactured in the same manner as described in Example 1. Example 5 differs from Example 1 in that the clad layer 23 was formed on the surface 22 of the cylinder head body (cast iron material) 21 constituting an engine as shown in FIG. 1 and that a clad layer consisting of two layers as described below was formed. Specifically, as a step of forming the clad layer, first, a step was performed in which a first clad layer (first layer) was formed on the surface of cast iron material so as to have a thickness of 0.1 mm. Next, a step was performed in which a second clad layer (second layer) was formed on the surface of the first clad layer so as to have a thickness of 1.9 mm (thickness 19 times that of the first clad layer). The material properties of the first and second clad layers were the same. The cross section of the cast iron member on which the clad layer consisting of the two layers was formed was observed. The observation results are shown in FIG. 5. The circle symbol indicates the case where bead cracks are absent or the case where gas defects are scarcely present. Also, the delta symbol indicates the case where bead cracks that do not hinder the use as a valve seat are present or the case where gas defects that do not hinder the use as a valve seat are present. The X symbol indicates the case where bead cracks that are undesirable to the use as a valve seat are present or the case where gas defects that are undesirable to the use as a valve seat are present.

Examples 6 to 8

Figure 6:
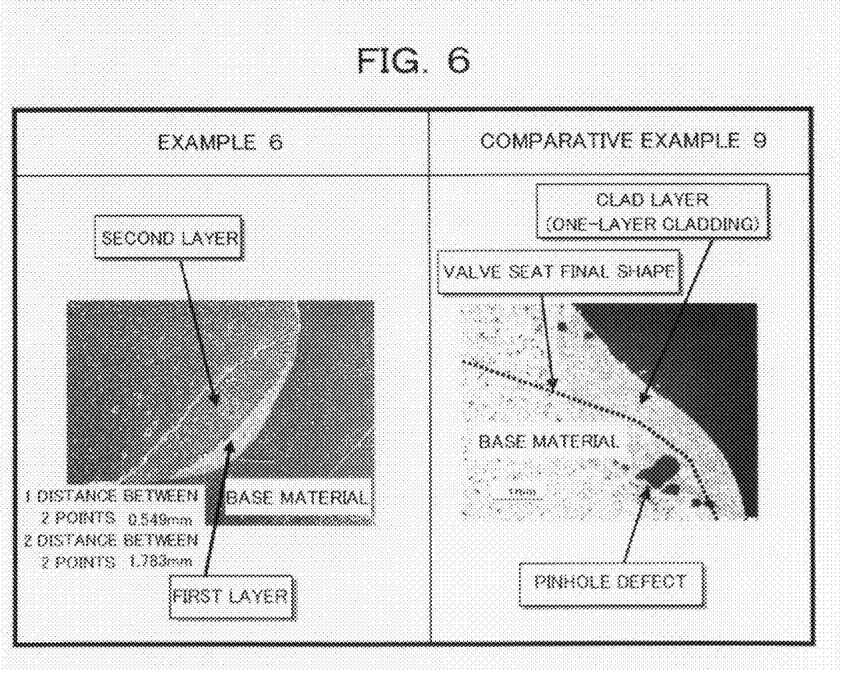
FIG. 6 is microphotographs showing cross sections of clad layers of Example 6 and Comparative example 9.

The clad layer was formed on the surface of cast iron material, and thereby the cast iron member was manufactured in the same manner as described in Example 5. Example 6 differs from Example 5 in that the thickness of the first clad layer was 0.5 mm, and the thickness of the second clad layer was 1.5 mm (3.0 times the thickness of the first clad layer). Example 7 differs from Example 5 in that the thickness of the first clad layer was 0.8 mm, and the thickness of the second clad layer was 1.2 mm (1.5 times the thickness of the first clad layer). Example 8 differs from Example 5 in that the thickness of the first clad layer was 1.0 mm, and the thickness of the second clad layer was 1.0 mm (1.0 times the thickness of the first clad layer). For the cast iron members on which these clad layers were formed as well, the cross sections were observed in the same way as in Example 5. The observation results are shown in FIG. 5. Also, the microphotograph of cross section of the cast iron member of Example 6 is shown in FIG. 6.

Comparative Examples 5 to 8

The clad layer was formed on the surface of cast iron material, and thereby the cast iron member was manufactured in the same manner as described in Example 5. Comparative examples 5 to 8 differ from Example 5 in that as shown in FIG. 5, the thickness of the first clad layer was smaller than 0.1 mm (Comparative example 5), or it was larger than 1.0 mm (Comparative examples 6 to 8), and that the second clad layer had a thickness larger than 19.0 times the thickness of the first clad layer (Comparative example 5), or it had a thickness smaller than 1.0 times the thickness of the first clad layer (Comparative examples 6 to 8). For the cast iron members on which these clad layers were formed as well, the cross sections were observed in the same way as in Example 5. The observation results are shown in FIG. 5.

Comparative Example 9

The clad layer consisting of only one layer was formed in the same manner as in Comparative example 2. The microphotograph of cross section of this cast iron member is shown in FIG. 6.

Result 3

As shown in FIGS. 5 and 6, in the clad layers of the cast iron members of Examples 5 to 8, bead cracks and gas defects that hinder the use as a valve seat were absent. In contrast, in the clad layers of the cast iron members of Comparative examples 5 to 9, either bead cracks or gas defects was present, so that the clad layers were unable to be used as a valve seat.

Consideration 3

It can be thought that if the first clad layer has a thickness in the range of 0.1 to 1.0 mm, the dilution of carbon into the second clad layer can be reduced, and therefore the generation of gas can be confined. In the case where the thickness of the first clad layer is smaller than that of the second clad layer (the second layer has a thickness larger than 19 times the thickness of the first layer) as in Comparative example 5, it can be thought that bead cracks are induced by the stress at the time of solidification shrinkage of the second clad layer. Also, in the case where the thickness of the first clad layer is larger than that of the second clad layer (the second layer has a thickness smaller than 1.0 times the thickness of the first layer) as in Comparative examples 6 to 8, gas defects are present in the clad layer as in Comparative example 9, and the gas defects may be exposed as void defects on the final shape surface of valve seat after the clad layer has been cut. Therefore, if the second clad layer is formed so as to have a thickness 1.0 to 19 times the thickness of the first clad layer, the induction of cracks caused by the thermal effect at the time of cladding of the second clad layer can also be reduced. Further, it can be thought that in order to form a high-quality clad layer free from cracks and gas defects, it is preferable that the first clad layer be formed on the surface of cast iron material so as to have a thickness in the range of 0.5 to 0.8 mm, and the second clad layer be formed so as to have a thickness in the range of 1.5 to 3.0 times the thickness of the first clad layer. Even if the material properties of the first and second clad layers are different from each other, almost the same effect is thought to be achieved if the material characteristics such as melting point and thermal expansion coefficient are close to each other.

Example 9

Figure 7:
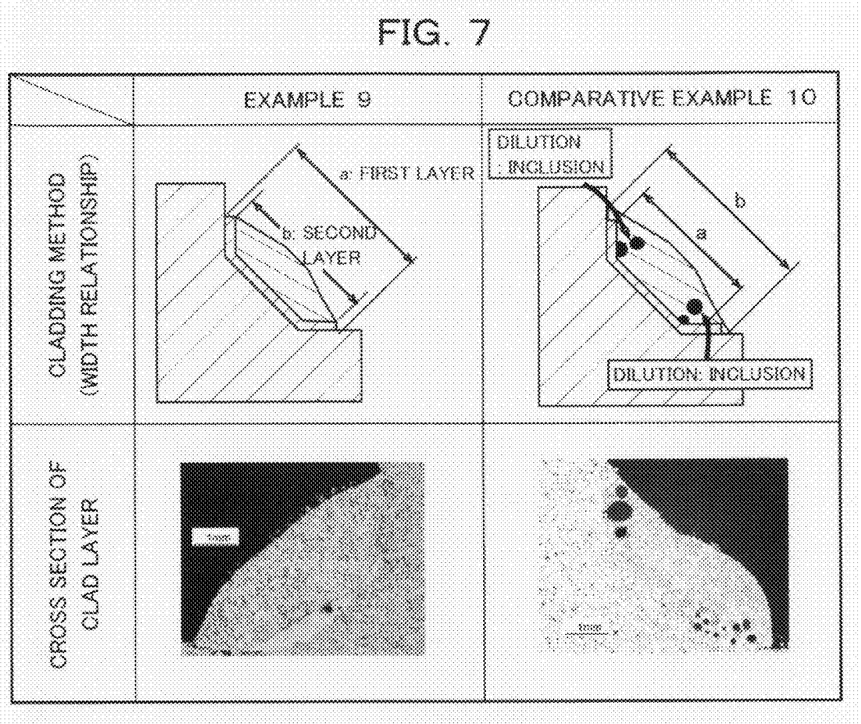
FIG. 7 is schematic views showing cross sections of clad layers of Example 9 and Comparative example 10.

The clad layer consisting of two layers was formed on the surface of cast iron material, and thereby the cast iron member was manufactured in the same manner as described in Example 5. Example 9 differs from Example 5 in that a step of forming the second clad layer was performed so that the second clad layer does not deviate from the surface of the first clad layer (width a>width b) as shown in FIG. 7. The cross section of the cast iron member on which this clad layer was formed was observed. The observation result is shown in FIG. 7.

Comparable Example 10

The clad layer consisting of two layers was formed on the surface of cast iron material, and thereby the cast iron member was manufactured in the same manner as described in Example 9. Comparative example 10 differs from Example 5 in that the step of forming the second clad layer was performed so that the second clad layer deviates from the surface of the first clad layer (width a<width b) as shown in FIG. 7. The cross section of the cast iron member on which this clad layer was formed was observed. The observation result is shown in FIG. 7.

Result 4

As shown in FIG. 7, although gas defects were absent in the clad layer of Example 9, gas defects (pinholes) were produced in the vicinity of a protruding portion of the clad layer of Comparative example 10.

Consideration 4

In the case where the width b of the second clad layer is greater than the width a of the first clad layer as in Comparative example 10, the inclusion of graphite of cast iron material occurs at both ends (protruding portions) of the second clad layer, and resultantly gas defects are easily produced in the second clad layer. Also, since the cladding material melts at the time of cladding, run may occur. Therefore, even in the case where the second clad layer having the same area as that of the first clad layer is formed on the surface of the first clad layer so as to match the surface of the first clad layer, it can be thought that the run of the second clad layer flows into the surface of cast iron material, so that gas defects may be induced. Therefore, it can be thought that assuming such melting and run, the step of forming the second clad layer is preferably performed so that the second clad layer does not deviate from the surface of the first clad layer.

Example 10

Figure 8:
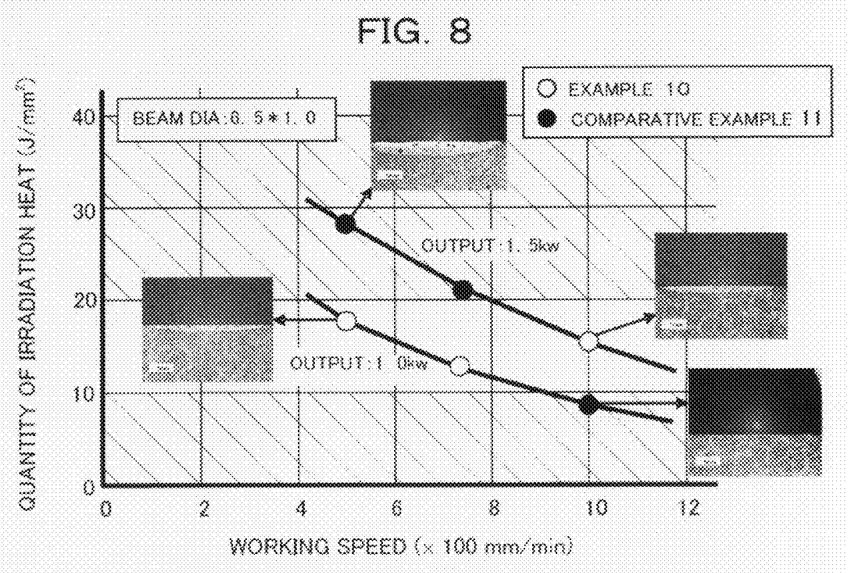
FIG. 8 is a graph for explaining the condition of the optimum incident energy of a laser in a pretreatment step by reference to Example 10 and Comparative example 11.

As a pretreatment step for the formation of clad layer, the surface of the cast iron material was irradiated with a laser the irradiation intensity of which was adjusted so that the irradiation intensity was not lower than the intensity capable of removing graphite contained in the surface layer of cast iron material that was the same as the material used in Example 1 and oil content in the graphite and so that the irradiation intensity was lower than the intensity at which the surface of the cast iron material melted. Specifically, the laser was adjusted so that the output of laser was 1.0 kW or 1.5 kW and the incident energy of laser on the surface of cast iron material was in the range of 10 to 20 J/mm$^2$ as shown in FIG. 8. The cross sections of the cast iron materials were observed. The observation results are shown in FIG. 8. Further, the clad layer was formed and thereby the cast iron member was manufactured in the same manner as described in Example 1, and then the cross section of the cast iron member was observed.

Comparative Example 11

A pretreatment step was performed in the same manner as described in Example 10. Comparative example 11 differs from Example 10 in that the incident energy of laser on the surface of cast iron material was lower than 10 J/mm² or higher than 20 J/mm². The cross sections of cast iron materials were observed in the same way as in Example 10. The observation results are shown in FIG. 8. Further, the clad layer was formed, and thereby the cast iron member was manufactured in the same manner as described in Example 10, and the cross sections of the cast iron members were observed.

Result 5

For all of the cast iron members of Example 10, a clad layer free from gas defects and cracks was formed. On the other hand, for the cast iron members having incident energy higher than 20 J/min² in the pretreatment step of the cast iron members of Comparative example 11, the outermost surface thereof was melted and chilled and cracks were generated on the surface of the base material thereof, and bead cracks were generated in the clad layer thereof. Also, for the cast iron member having incident energy lower than 10 J/mm² in the pretreatment step, gas defects were produced in the clad layer thereof.

Consideration 5

In the case where the incident energy is lower than 10 J/mm² as in Comparative example 11, it can be thought that gas defects are produced in the clad layer because graphite and oil content in the graphite cannot be removed. On the other hand, in the case where the incident energy is higher than 20 J/mm², it can be thought that cracks are generated easily by the chilling of cast iron material, and bead cracks are generated in the clad layer as well by the generation of the crack caused by chilling. Therefore, it can be thought that if the laser is adjusted so that the incident energy of laser on the surface of cast iron material is in the range of 10 to 20 J/mm² as in Example 10, the graphite and the oil content in the graphite included in the surface of cast iron material can be removed, and the surface of cast iron material is not melted and chilled, so that a high-quality clad layer can be formed.

Example 11

Figure 9:
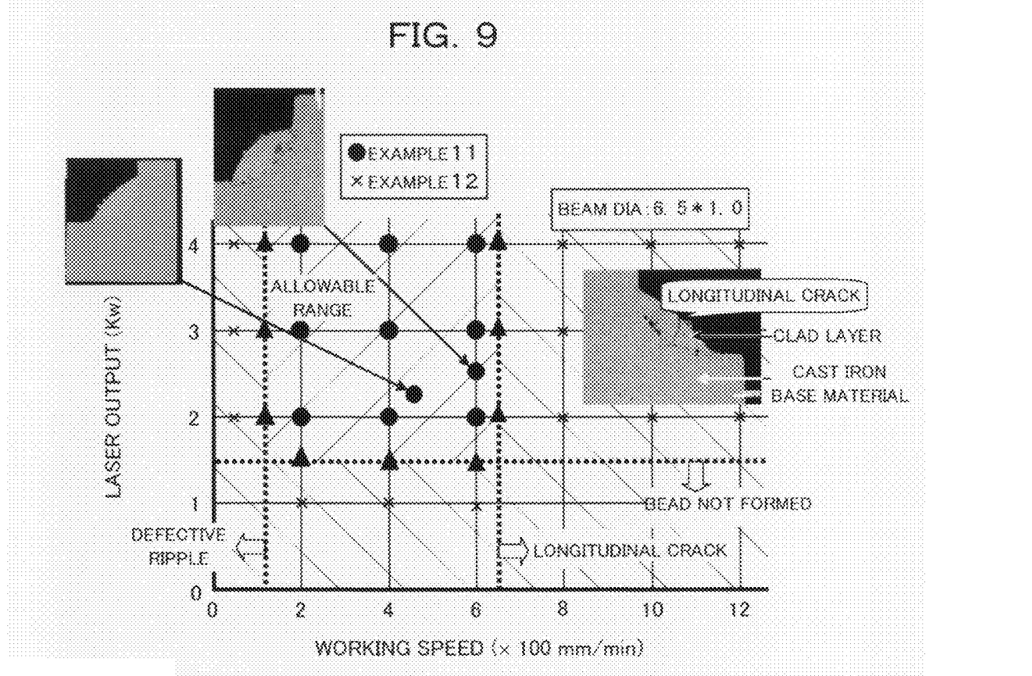
FIG. 9 is a diagram for explaining the optimum working speed by reference to Example 11 and Comparative example 12.

The clad layer was formed on the surface of cast iron material, and thereby the cast iron member was manufactured in the same manner as described in Example 9. Example II differs from Example 9 in that the clad layer was formed by setting the speed (working speed) V for moving the laser irradiation device 10 shown in FIG. 1 relatively with respect to the cast iron material (cylinder head body) 21 in the range of 150 to 600 mm/min as shown in FIG. 9 (as indicated by the black circle symbol). The appearances and cross sections of the cast iron members were observed. The observation results are shown in FIG. 9. In this example, cladding was performed with a laser output not lower than 1.5 kW because no bead is formed when the laser output is lower than 1.5 kW.

Comparative Example 12

The clad layer was formed on the surface of cast iron material, and thereby the cast iron member was manufactured in the same manner as described in Example 11. Comparative example 12 differs from Example 11 in that cladding was performed under the condition that the relative movement speed (working speed) V was lower than 150 mm/min or higher than 600 mm/min as shown in FIG. 9 (as indicated by the X symbol). The appearances and cross sections of clad layers were observed. The observation results are shown in FIG. 9.

Result 6

Figure 10:
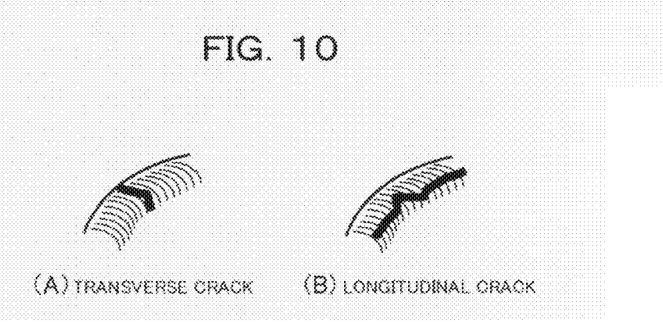
FIG. 10 is perspective views for explaining modes of cracks in a clad layer.

For the cast iron members of Example 11, gas defects and bead cracks were not found in the clad layer. In the case where the working speed was lower than 150 min in Comparative example 12, the ripple of bead was intermittent (irregularities were heavy), so that a clad layer capable of being used as a valve seat could not obtained. In the case of conventionally general one-layer cladding, transverse cracks crossing the valve seat (clad layer bead) have been generated at indefinite positions in the direction perpendicular to the circumference of valve seat as shown in FIG. 10(a). In contrast, in the case where the working speed is higher than 600 mm/min in Comparative example 12, a longitudinal crack extending longitudinally along the valve seat was generated as shown in FIG. 10(b).

Consideration 6

The longitudinal crack as in Comparative example 12 is a crack (phenomenon) occurring continuously in parallel with the circumference with respect to the bead, so that the longitudinal crack is thought to be caused by the increase in stress applied to the whole bead. It can be thought that the generation of such a crack restrains gas defects and local transverse cracks (bead cracks) owing to the two-layer cladding, and on other hand, is caused by the increase in stress applied to the whole bead. The reason why an influence of working speed is shown remarkably is thought to be that a stress causing the crack is created mainly by the cooling rate. Therefore, it can be thought that by setting the working speed in the range of 150 to 600 mm/min as shown in Example II (specifically, by decreasing the working speed from the working speed for conventionally general one-layer cladding (900 mm/min)), the cooling rate of clad layer is reduced, and the stress created in the whole clad layer bead is reduced, by which the generation of bead cracks can be avoided.

This description takes in the whole contents of all publications cited in this description. Also, those skilled in the art will easily understand that the present invention can be modified and changed variously without departing from the technical concept and the scope of invention described in the appended claims. The present invention intends to embrace such modifications and changes.

The invention claimed is:

1. A method for manufacturing a cast iron member having a clad layer, comprising:

a step of forming the clad layer by melting a cladding material by means of irradiation of a laser emitted from a laser irradiation device and by depositing the melted cladding material on a surface of a part of a cast iron material, wherein a main ingredient of the cladding material is a copper element, wherein the step of forming the clad layer is performed by using the cladding material so that when the clad layer is formed, a hardened layer having a thickness of 0.01 to 2.0 mm is formed on the surface of the cast iron material, and wherein the step of forming the clad layer comprises at least:

a step of forming a first clad layer on the surface of the cast iron material in such a manner that its thickness range would be 0.1 to 1.0 mm; and a step of forming a second clad layer on the surface of the first clad layer in such a manner that its thickness range would be 1.0 to 19 times the thickness of the first clad layer, wherein, as a pretreatment to the step of forming the clad layer, graphite contained in a surface layer of the cast iron material is removed by irradiating the surface of the cast iron material with the laser in such a manner that the surface of the cast iron material does not melt.

2. The method for manufacturing a cast iron member according to claim 1, wherein the cladding material has an oxygen content of 200 ppm or lower.

3. The method for manufacturing a cast iron member according to claim 1 wherein the step of forming the clad layer is performed by adjusting the irradiation intensity of the laser to 200 W/mm² or higher.

4. The method for manufacturing a cast iron member according to claim 1, wherein the step of forming the second clad layer is performed so that the second clad layer does not deviate from the surface of the first clad layer.

5. The method for manufacturing a cast iron member according to claim 1, wherein the irradiation intensity of the laser is adjusted so that the incident energy of the laser applied to the surface of the cast iron material is in the range of 10 to 20 J/mm².

6. The method for manufacturing a cast iron member according to claim 1, wherein the step of forming the clad layer is performed while either one or both of the laser irradiation device and the cast iron material are moved relatively at a speed in the range of 150 to 600 mm/min.

* * * * *